United States Patent
Brauff et al.

(10) Patent No.: US 10,447,627 B2
(45) Date of Patent: Oct. 15, 2019

(54) JOURNALING, ANALYSIS, AND ARCHIVING OF ELECTRONIC COMMUNICATIONS

(71) Applicant: ZIXCORP. SYSTEMS, INC., Dallas, TX (US)

(72) Inventors: Craig A. Brauff, Bellevue, WA (US); Calvin R. Cochran, Tacoma, WA (US); Justin D. Perkins, Renton, WA (US)

(73) Assignee: ZixCorp Systems, Inc., Dallas, TX (US)

(*) Notice: Subject to any disclaimer, the term of this patent is extended or adjusted under 35 U.S.C. 154(b) by 0 days.

(21) Appl. No.: 15/384,201

(22) Filed: Dec. 19, 2016

(65) Prior Publication Data

US 2017/0099241 A1    Apr. 6, 2017

Related U.S. Application Data

(63) Continuation of application No. 14/741,897, filed on Jun. 17, 2015, now Pat. No. 9,548,956, which is a continuation of application No. 13/179,700, filed on Jul. 11, 2011, now abandoned.

(51) Int. Cl.
| | | |
|---|---|---|
| *H04L 12/58* | (2006.01) | |
| *G06Q 10/10* | (2012.01) | |
| *H04L 29/08* | (2006.01) | |

(52) U.S. Cl.
CPC ......... *H04L 51/066* (2013.01); *G06Q 10/107* (2013.01); *H04L 51/10* (2013.01); *H04L 51/32* (2013.01); *H04L 67/22* (2013.01)

(58) Field of Classification Search
CPC ....... H04L 51/32; H04L 51/066; H04L 67/22; H04L 51/10; G06Q 10/107
See application file for complete search history.

(56) References Cited

U.S. PATENT DOCUMENTS

| | | | |
|---|---|---|---|
| 2007/0038714 A1* | 2/2007 | Sell | H04L 51/22 709/206 |
| 2009/0049146 A1* | 2/2009 | Okita | H04L 67/02 709/206 |
| 2011/0252057 A1* | 10/2011 | Huang | G06F 17/30554 707/770 |
| 2012/0149339 A1* | 6/2012 | Mulampaka | H04L 51/16 455/412.1 |

(Continued)

OTHER PUBLICATIONS

Instant, Mar. 3, 2009. "Integrated Archiving for IBM Lotus Sametime Chats and EMC SourceOne." Retrieved on Dec. 10, 2011 from <http://www.instant-tech.com/Integrated_Archiving.cfm>.*

(Continued)

*Primary Examiner* — Shean Tokuta
*Assistant Examiner* — Juan C Turriate Gastulo
(74) *Attorney, Agent, or Firm* — Baker Botts L.L.P.

(57) ABSTRACT

Disclosed is a communication journaling and archival system which obtains content from social networks, handles re-authentication requirements which occur with respect to monitored users and social networks, includes content obtained from social networks in a journal and archiving system compatible with email journaling and archiving, and can be configured to send a journaled communication to multiple journal destinations and journal formats.

15 Claims, 6 Drawing Sheets

(56) References Cited

U.S. PATENT DOCUMENTS

2013/0013567 A1* 1/2013 Constantinescu ............................ G06F 17/30073
707/667

OTHER PUBLICATIONS

Wilkins, Jesse, Jul. 12, 2010. "Managing Tweets as records part 2: how to capture." Retrieved on Dec. 10, 2011 from <http://community.aiim.org/blogs/jesse-wilkins/2010/07/12/managing-tweets-as-records-part-2-how-to-capture>.*

Fance, Charnita, May 18, 2009. "How to Backup Your Twitter Archive." Retrieved on Dec. 10, 2011 from <http://www.makeuseof.com/tag/how-to-backup-your-twitter-archive/>.*

* cited by examiner

JOURNALING, ANALYSIS, AND ARCHIVING OF ELECTRONIC COMMUNICATIONS

CROSS-REFERENCE TO RELATED APPLICATIONS

This application is a continuation of U.S. patent application Ser. No. 14/741,897, filed Jun. 17, 2015, which is a continuation of U.S. patent application Ser. No. 13/179,700, filed Jul. 11, 2011, which applications are incorporated herein, in their entireties, for all purposes.

SUMMARY OF THE INVENTION WITH BACKGROUND INFORMATION

Governmental regulatory bodies, courts, and laws required that certain communications be preserved and require that organizations and individuals respond to certain communications in prescribed manners. For example, an insurance company may be required to log (and potentially respond to) all instances in which a litigation threat is made to an insurance broker in relation to a policy written by the insurance company, even if the broker is not employed directly by the insurance company, but is an independent contractor representing multiple insurance companies. In another example, a company involved in litigation may be required to produce all communications to or from a particular employee or type of employee. In another example, a company may be required to handle credit card information in ways prescribed by contract and/or law, such as that credit card information be encrypted and/or that it not be held for longer than a specified period of time. In the United States, Sarbanes Oxley, HIPAA, the Data Protection Act, the Patriot Act, and other laws require that certain communications be preserved, sometimes in different ways (such as with different security levels) and/or responded to in different ways. Hereinafter, the term "monitored user" will refer to a party whose communications need to be journaled and archived; the monitored user may be a party such as the broker discussed above, an employee of a company, or similar.

Various service providers and software companies have begun to address the need to journal and archive electronic communications, such as email, and one-to-one or one-to-many instant messaging. However, many such solutions require that the email and/or instant messaging take place on computers under the control of the company with the journaling need and/or under the control of a journaling service provider. For example Microsoft, Inc., released an email journaling feature in service packs for Exchange™ dating back to 2000, 2003, and 2004. As is typical, the feature requires that rules be set to determine which emails should be journaled, rules based on a sender or recipient. Journaling and archiving systems commonly operate at the email server by copying a journaled message to a new email (often as an attachment), preserving the journaled message's original headers in the message body of the new email (if an email is merely forwarded by an email client, the original headers are often discarded or modified), optionally utilizing different protocols to record bcc recipients, recipients from distribution groups, and recipients who result from forwarding rules, and sending the new journal email to a journaling server and/or archive server. These systems represent a problem relative to the example provided in the preceding paragraph with respect to the insurance company broker who, as an independent contractor, may be using an email service not controlled by the insurance company. Steps may be taken to forward the email from the broker's site to the insurance company or a journaling/archiving service provider, though these steps assume that the broker controls the broker's email server, which may not be the case, and/or such an approach may result in forwarding too many emails to the journaling/archiving service provider, such as forwarding all of the broker's email and/or email from others at the broker's location which may meet the forwarding criteria. In addition, existing journaling and archiving systems do not address communications which take place in social media. Social media present a different set of problems in terms of identifying which and how communications are to be journaled/archived, accessing the social media providers, and maintaining access to the social media providers in a way which is not taxing to the monitored user.

In addition, a journaling/archiving service provider may find that an email to be journaled and archived needs to be sent to multiple journal and archive destinations, such as if the monitored user represents a company with multiple journaling and archiving destinations or if the monitored user represents more than one company, each of which may have multiple journaling and archiving destinations. For example, FIG. 3 (not showing prior art) presents a diagram of a monitor 305. The monitor 305 may be engaged by one or more monitor customers 303 to monitor the communications sent and received by the monitored users 301.A through 301.C from communicators 105.A through 105.C (who may be anyone the monitored users 301 communicate with, including the monitor customer 303 and others). The monitor 305 may maintain its own journal servers 221 and archives 223 to journal and archive monitored communications; the monitor customer 303 may also require that communications be sent to a 3rd party monitor 307, separate from the monitor 305; the 3rd party monitor may maintain journal servers and archives (not shown) or may perform other operations with respect to monitored communications, such as (for example) indexing content to improve a search algorithm. The multiple archives 223.A through 223.C and archives and/or other processors of the 3rd party monitor 307 may utilize different formats, may have different security requirements, or generally have different structures. In this case, the multiple journaling and archiving destinations may accept the message to be journaled in different formats.

In existing approaches, multiple journaling and archiving systems must be setup separately to address the monitored users 301. In addition, the monitor 305 would not handle social media. In addition, different journaling and archiving systems maintained by monitor 305 and 3rd party monitor 307 do not work together.

In the context of email, emails generally have a structure comprising an envelope, one or more headers, a message body (or simply "body"), and attached messages. Email format is generally described in Request for Comments ("RFC") 5322, published by the Network Working Group of the Internet Engineering Task Force ("IETF"), with additional information in RFC 5321, Simple Mail Transfer Protocol ("SMTP"). The envelope generally contains addressing information which is used by email servers to route the email, generally the "to" address and a "from" or "on behalf of" address. The header generally contains addressing and additional information (such as subject and date/time), though the header information is not necessarily used by email servers to route the email. The message body generally contains text in ASCII format. Email attachments are generally in a Multipurpose Internet Mail Extensions ("MIME") format, which makes possible text in character sets other than ASCII (including for use in supporting non-ASCII header information), non-text data attachments, message bodies with multiple parts, and as otherwise specified in the following RFCs: 2045, 2046, 2047, 4288, 4289, and 2049. As used herein, emails are discussed as comprising an outer message comprising an envelope, header, body, and attachments (if any), as well as potentially comprising an inner message. The inner message may comprise the same parts (envelope, header, body, and attachments), though the envelope of the inner message is not generally used to route the inner message. The inner message is carried in the message body of the outer message or as an attachment to the outer message. The inner message is not routed separately from the outer message (which is routed). The inner message is an email message which is attached to or made part of (the body of) the outer message.

An email journal message or journal message is an outer email message which includes an inner message comprising content from a new email message. The journal message (including both outer and inner parts) may be journaled, analyzed and archived, while the new message (just the inner part of the email journal message) is sent (separately from the email journal message) to the intended recipient. In addition to the inner message comprising content from the new email message, the journal message may contain metadata related to the new message, such as times, dates, names/physical location of/identifiers for individuals involved in the communication, and/or a class or category assigned to the message by a person or by rules executed by a software program. The journal message generally follows an email transport format, such as SMTP, and is sent as an email to an email journal server. The journal message may be encrypted and/or may not be accessible to the end-user who generated the new email message which was journaled. The journal message may be handled as an email by existing communication infrastructure.

Archiving generally refers to backing up a communication, often to an off-site location or to files not actively used by an end user's email client. A journaling system may be used as an interface to an archival system.

Recently, social media (such as Facebook, Twitter, and similar) have become widely used as communication forums. Social media present many challenges in the context of journaling and archiving communications, including that authorization is required from the social media forum to perceive the communication, that social media authentication and authorization systems change frequently, that the presentation of communications to users within a social media context may depend on a host of factors (there is not necessarily a "sender" and a "recipient"), and that a wide range of communication modes are possible, including video, photographs, text exchanges taking place across short or long time frames, communications composed of content from multiple contributors selected by the social media operator and advertisers, and communications directed algorithmically at groups, rather than from one individual to another or through broadcasts.

Needed is a communication journaling and archiving system which i) obtains specified content from a social media network, re-authenticates with the social media network as necessary, ii) stores email, instant message, and content from social media networks in a system compatible with email journaling and archiving systems, and iii) can be configured to send a journaled communication to multiple journal destinations and journal formats.

SUMMARY

Disclosed is a communication journaling and archival system which obtains content from social networks, handles re-authentication requirements which occur with respect to monitored users and social networks, includes content obtained from social networks in a journal and archiving system compatible with email journaling and archiving, and can be configured to send a journaled communication to multiple journal destinations and journal formats.

DETAILED DESCRIPTION

Figure 1:
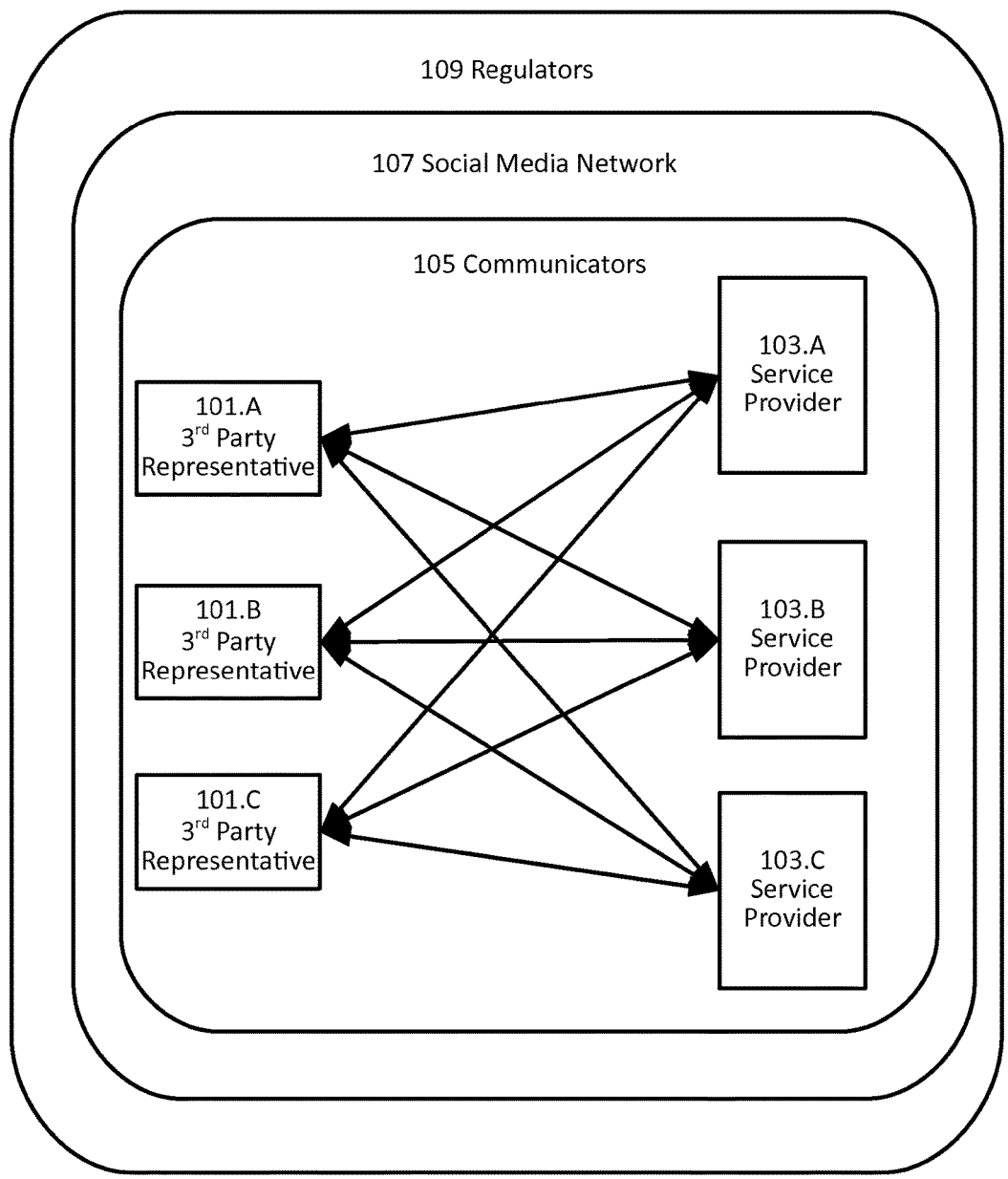
FIG. 1 depicts parties, devices, and certain communication paths in a functional block diagram.
Figure 3:
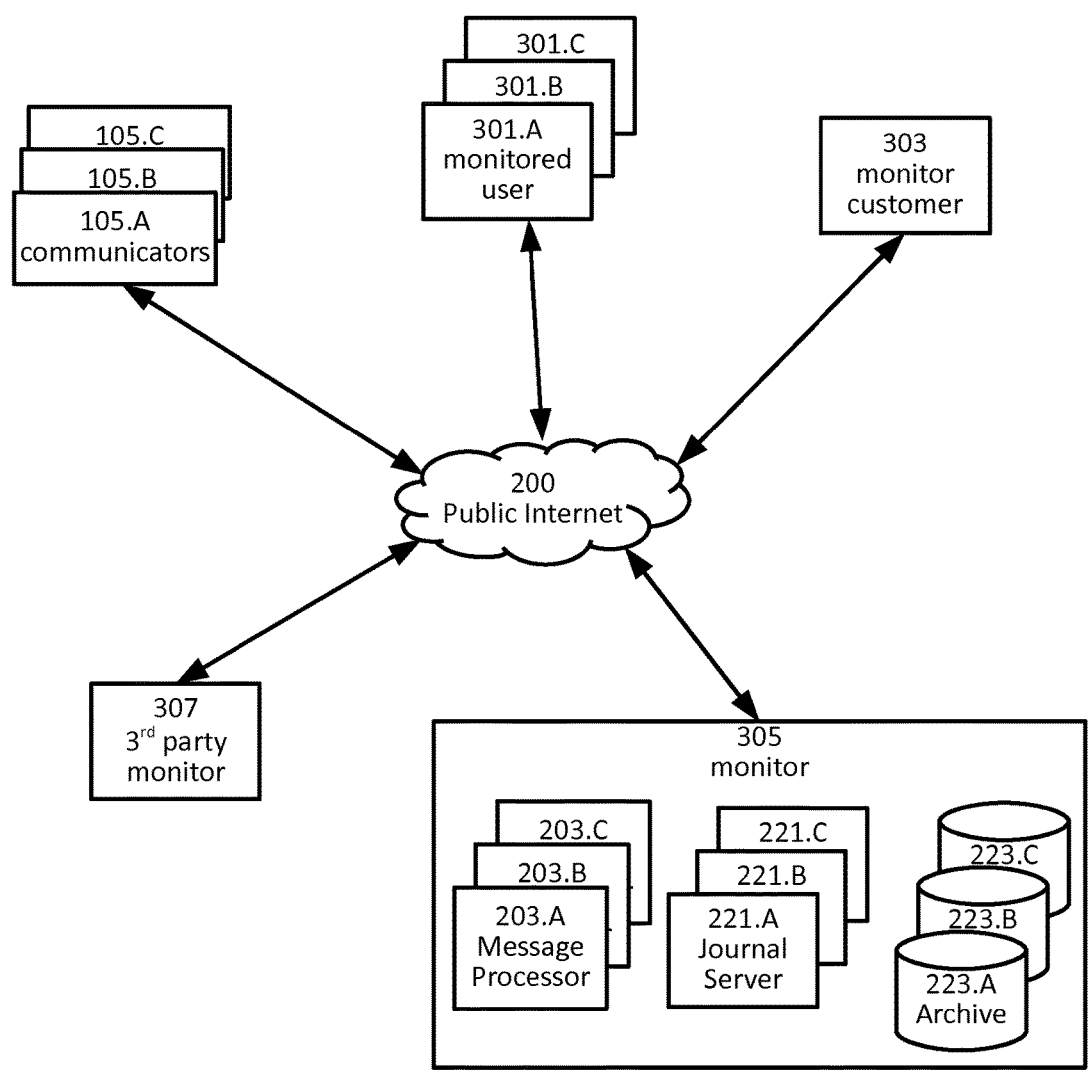
FIG. 3 is a functional block diagram depicting an example of devices and certain communication paths.

FIG. 1 diagrams parties involved in a set of communications used as an example in these papers. Components 101.A through 101.C depict example representatives of service providers, service providers depicted by components 103.A through 103.C; these parties may be, for example, stock/bond brokers, dealers, banks, insurance companies, or other product or service providers. The representatives 101.A-101.C are labeled as "3rd party Representatives," though they may be employees of one or more of the service providers 103.A-103.C. A line is drawn between each of the representatives 101.A-101.C and the service providers 103.A-103.C, each line representing a one-to-one or one-to-many communication connection, such as may be provided by email or instant messaging. Communication lines (not shown) may also exist between the representatives as well as between service providers. The representatives 101 and service providers 103 are also referred to herein as "monitored users" and are also depicted in FIG. 3 as monitored users 301.A through 301.C. 3rd party Representatives 101 (or monitored users 301) as well as others (such as service providers 103.A-103.C) may also be customers of a journaling and archiving service (also referred to as a monitor 305), in which case they are referred to herein as "monitor customers 303."

Surrounding the representatives 101 and the service providers 103 are communicators 105. The communicators 105 may be customers of the representatives 101, the service providers 103, or both. The communicators 105 may also be those who are not customers, but who may nonetheless have legally significant communications with the representatives 101 and/or the service providers 103, which communications need to be preserved. The communicators may communicate with one another and the other parties shown in FIG. 1 via email, instant messaging, through social media networks 107, through phone, videophone, physical mail, and in-person.

Around the representatives 101, service providers 103, and communicators 105 in FIG. 1 is depicted a social media network 107. More than one social media network 107 may exist. The social media network 107 may, for example, provide an Internet based forum for exchanging identity information, text, pictures, audio, video (collectively referred to herein as "content"), and computer applications (referred to herein as "apps") between users of the social media network 107. The users of the social media network 107 may (without limitation) include the representatives 101, the service providers 103, the communicators 105, and the regulators 109. A user of the social media network, such as a communicator 105, may have a "home," "wall," "landing page" or similar within the user interface of the social media network where the social media network user can post and manage content, interact with apps, identify other users with whom the user is associated (referred to herein as "friends"), and search the social media network 107 and/or the Internet. The social media network 107 may provide users with a set of permissions defining whether and how various of the user's content may be accessed by others, including other users, advertisers, app developers, and users of the Internet in general. The permissions may be set with respect to particular content items (such as a photograph, a video, the user's name, address, or similar) or groups of items (such as all photos, all videos, folders, etc.) and may specify how far the permission may propagate, such as to a friend, a friend-of-a-friend, app providers, etc. Permissions may last indefinitely or may time out. Permissions in social media networks 107 may be changed by users as well as by the operator of the social media network 107.

Permissions may be managed, for example, through the use of an OpenID identifier or OAUTH credential or token (referred to herein as an "OAUTH credential"). Instead of providing the user's credentials (typically a username and password), the monitored user 301 (or a social media network acting on behalf of the user) may provide an OAUTH credential which provides access to some or all of a user's content in the social media network 107 for a period of time (ranging from indefinite to for a specified period). The user may provide the OAUTH credential by interacting with, for example, a "flow" supported by the social media network 107, such as a user-agent flow, a web server flow, a device flow, or others.

In a typical flow, the monitor 305 has an account with the social media network; the monitor 305 uses the account to configure authorization requests which the monitor 305 expects to generate in relation to monitored users 301. The monitor 305 then generates a hypertext link containing output from a hash algorithm, such as an MD5 or cryptographic algorithm, performed on an identifier for the monitored user and/or on an identifier for the monitor 305 or performed on content from the social media network associated with the monitored user, which link is sent or otherwise presented to a monitored user. When the monitored user clicks on or otherwise activates the link, the link directs the monitored user to a webserver operated by the monitor which may then redirect the monitored user to a webpage or similar generated by the social media network. The hash output identifies the monitored user 301 and the monitor 305 to the social media network. The social media network's webpage provides the monitored user 301 with an opportunity to grant permissions to the monitor 305. If the monitored user approves the grant of permissions, then the social media network typically issues an OAUTH credential to the monitor 305. Other flows may be used.

Turning back to FIG. 1, regulators 109 are depicted around the other parties. The regulators 109 may include governmental regulatory bodies, courts, laws, trade group policies, contractual terms and similar which require that certain communications be preserved for prescribed times and require that organizations and individuals respond to certain communications in prescribed manners. For example, an insurance company may be required to log (and potentially respond to) all instances in which a litigation threat is made to an insurance broker in relation to a policy written by (or under) the insurance company, even if the broker is not employed directly by the insurance company, but is an independent contractor representing multiple insurance companies. In another example, a company involved in litigation may be required to produce all communications to or from a particular employee or type of employee. The regulatory requirements may be imposed on all the parties depicted in FIG. 1. In order to preserve and potentially respond to communications as required by the regulators 109, one or more of the service providers 103.A-103.C may obtain message journaling and archiving services, such as from the monitor 305 depicted in FIGS. 2 and 3.

Figure 2:
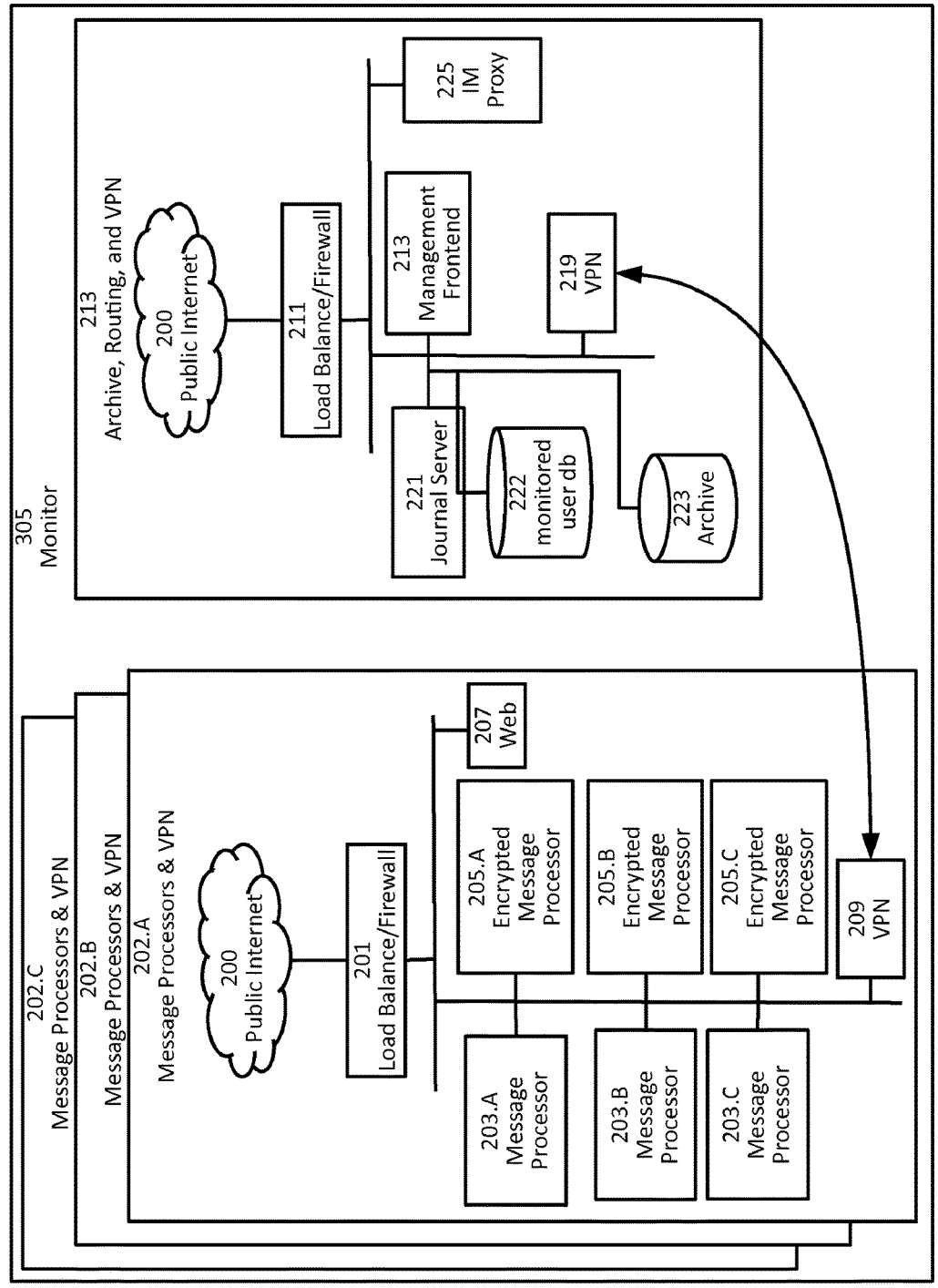
FIG. 2 depicts devices and certain communication paths of a monitor in a functional block diagram.

FIG. 2 depicts a single monitor 305 with a system comprising multiple components. Within these components, box 202.A depicts a message processor and VPN (virtual private network); additional boxes 202.B and 202.C signify that there may be more than one set of these items (still within one message journaling and archiving service provider). Box 213 depicts components used for archiving, routing, and VPN. The components in boxes 202 and 213 may be physically located together or apart (as shown). Within box 202, there is a component for a public Internet connection 200, which is connected to a load balancing and firewall component 201. The load balancing and firewall 201 may then be connected to an internal network (such as, without limitation, an ethernet network) connected to one or more message processing components 203, one or more encrypted message processing components 205, a web server 207, and a VPN server 209. The message processors 203 may receive, for example, messages such as emails, instant messages, and similar. Messages may be sent, for example, by a representative 101, a service provider 103, or another monitored user 301. As discussed above, the monitored user 301 may configure the monitored user's email server to send a copy or branch of all inbound and outbound email messages to the monitor 305, which branch maintains the original message envelope. The monitored user may configure the monitored user's instant messaging client(s) to use the IM proxy 225 of the monitor 305. The message processors 203 may also be used to transmit email out of the monitor 305. The outbound message processors 205 may be used if outbound communications require encryption not typically offered by the message processors 203.

The VPN server 209 at the message processor 202 is connected to a VPN server 219 at the archive, routing, and VPN component 213. The archive, routing, and VPN component 213 is also depicted as comprising a public Internet connection 200, a load balancing and/or firewall component 211, which is connected to an internal network (such as, without limitation, an ethernet network) connected to components for a journal server 221, a monitored user database 222, an archive 223 (which may be one or more databases, one or more flat files, etc.), a management frontend 213 (which may provide a web or other interface for monitor customers 303 and the monitor 305), and an IM proxy 225. The journal server 221 routes messages to other journal servers (221.A through 221.C in FIG. 3 and potentially 3rd party monitor 307 in FIG. 3) and archives (223.A through 223.C in FIG. 3 and potentially 3rd party monitor 307 in FIG. 3), according to the method discussed below. The monitored user database 222 may be one or more databases, flat files, or similar containing records associated with monitored users, such as identifiers associated with monitored users, social media provider identifiers associated with monitored users, email addresses, phone numbers, instant message identifiers and similar associated with monitored users, the output of hash algorithms performed on content associated with monitored users, the output of hash algorithms performed on identifiers associated with monitored users, time/date stamps, and similar.

Figure 4:
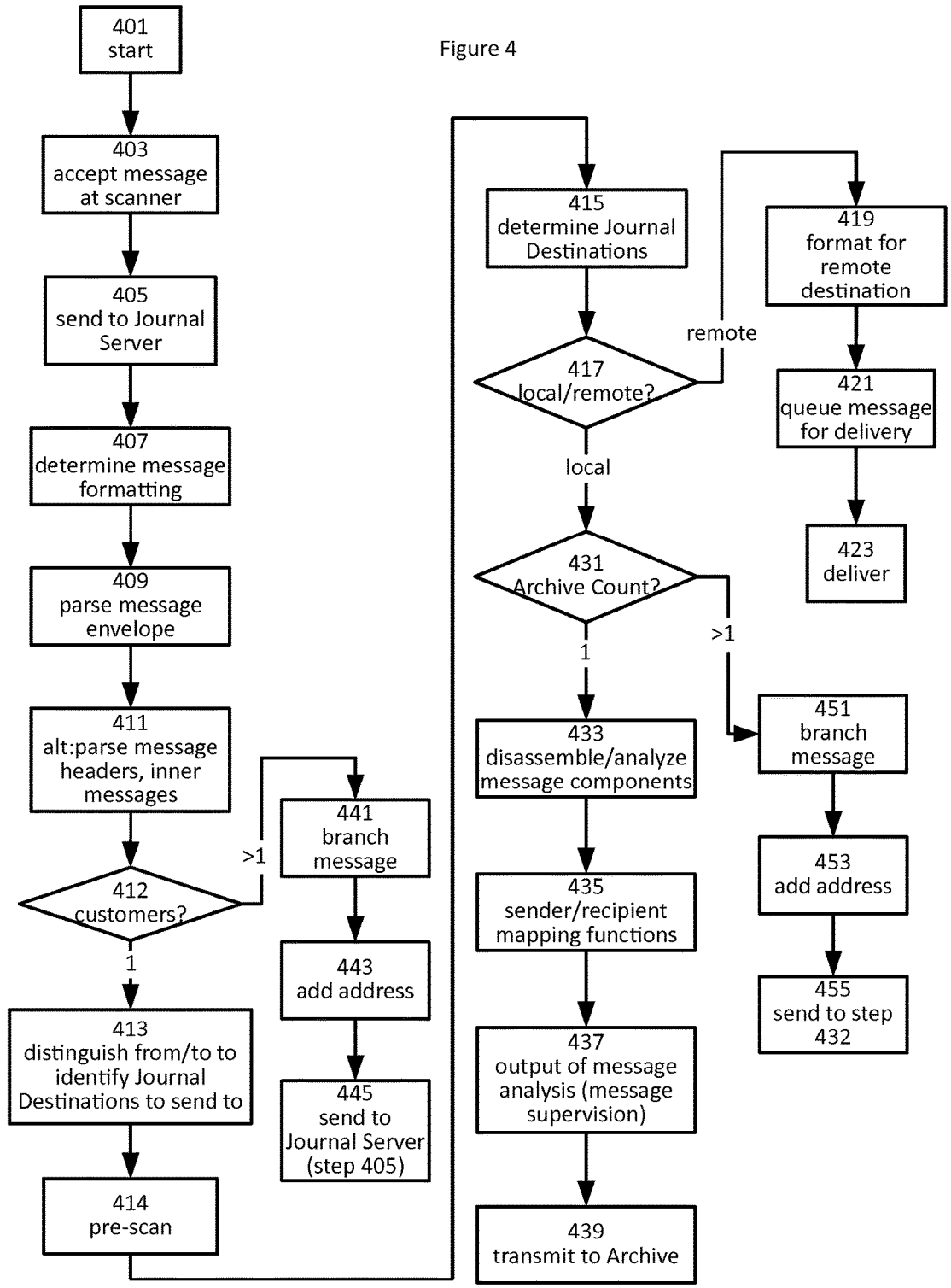
FIG. 4 is a flow chart of a process described in these papers.

FIG. 4 depicts a flow chart of steps in a process wherein messages are received, journaled, and archived. The messages may include email such as may be received at a message processor 203 and/or instant messages received or sent by an instant message client utilizing the IM proxy 225. The messages may include email comprising content from a social media network, as discussed further below in relation to FIG. 5.

Step 403 depicts accepting a message at a scanner, which scanner may be a message processor 203. The scanner may provide geographic redundancy and may verify that the message is a properly formatted email. The message is then sent, for example using the VPN 209, as a journal message to the journal server 221. The message is sent as an inner message attached to or part of an outer message. After being accepted (not shown) at the journal server 221, the message formatting is determined 407. If the outer message was sent by the message processor 203, the format may be a known first format utilized by the message processor 203. If the message is from a third party and does not conform to the first message format, the journal server 221 may determine if the format conforms to another message format, such as the message journal format used by Microsoft, Inc. or another format. The message format is determined so that in step 409 the outer message envelope may be parsed to identify what address the outer message was sent to and what address the outer message was sent from. Determining the message format may also be used to identify headers, body, and attachments, which body and attachments may further comprise one or more inner email messages. If step 409 was not successful, then step 411 may be performed to obtain address data from the outer message headers or, in further alternatives, from inner message envelopes, headers, bodies, or attachments.

At step 412, the number of monitor customers 303 associated with the addressing is determined (referred to in the claims as a "monitor customer container count"). The number of monitor customers 303 may be based on domain names and/or other email address portions obtained at step 409 (or 411). Specific email addresses may be assigned to specific monitor customers and/or strings or coded strings in the envelope addresses, in headers, body, or attachments may identify or be associated with monitor customers 303. If more than one monitor customer is determined, then the process moves to step 441. At step 441 the message is branched. Branching may mean that both the inner and outer messages are included as inner messages in a new outer message or it may mean that only the inner message is included in a new outer message. As an example, at step 443 at least one address from or associated with the monitored customers which caused the monitored customer count to exceed one is used as an address in the envelope for the outer message of the message branch. At step 445 the message branch is processed by the journal server, similar to step 405. The message may be branched once at step 441 and the process of steps 407 to 445 iterated to address multiple customers, with one of the addresses which caused the customer count to exceed one being used, removed, or flagged on each iteration (such as by using a specified variation on the address in the envelope for the branch); alternatively, at step 441 a branch of the message may be made for each customer exceeding one, executing steps 441 through 445 in a batch process for the set of customers exceeding one.

At step 413 records associated with the monitored users associated with the monitored customers are checked to determine if one or more of the monitor customers have requested multiple journal destinations and/or multiple journal sub-destinations based on the monitor customer and the sender/recipient in the addressing. For example, a monitor customer may have requested that any email sent to/from <example@sample.com> be sent to both one or more remote journaling service and one or more local journaling service(s). At step 414 a pre-scan may be performed. The pre-scan may analyze one or more of inner and/or outer envelopes, headers, bodies, and/or attachments to identify if the message contains content associated with a subset of the journal destinations identified in step 413. The pre-scan step 414 may be performed before or in conjunction with step 413.

At step 417 a decision is made regarding whether the message is to be routed to a local or a remote journal destination. If the journal destination is remote (for example, a journal not controlled by the monitor 305 and/or the party executing the process outlined in FIG. 4), then at step 419 the format for the remote destination may be applied. As examples, the following formats may be utilized: an email format (delivered, for example, using SMTP); a text format (up/downloaded via FTP or secure FTP); an XML format (up/downloaded via FTP or secure FTP); an SQL format (delivered via SQL insert); and/or in a Lotus Notes format. At step 421 the message is queued and delivered at step 423. If an email format was used, then delivery will typically use SMTP; if a text format was used, then the text file will typically be up/downloaded via FTP or secure FTP; if an XML format was used, the XML file will typically be up/downloaded via FTP or secure FTP; if an SQL format was used, then delivery will typically be via an SQL insert. Delivery of the message may be from a VPN component, such as 219 and/or 209, and/or may follow additional criteria, such as that delivery will not be done if it cannot be done via VPN or through another secure channel or only that best efforts will be made to deliver the message (securely or otherwise).

If the journal destination is local, a determination may be made at step 431 regarding whether there is one or more than one archive to which the message is to be sent. If there is more than one archive (more than one place to send the message to for each customer associated with a message, such as with a domain name in a message address), then at step 451 a branch of the message is made for each destination, an address is created for the message branch at step 453, and the message branch is sent to the archive (via the address) at step 455. To avoid a looping condition, a flag may be set and/or the address created for the message branch may be a specified address format which indicates that the message branch address is derived from an address in the message and that the created address in the message should not be used again. These are examples; other ways may be used to avoid looping conditions and/or to otherwise reduce processing of the branch.

At step 433 the message components are disassembled, decoded, and analyzed, such as to obtain ASCII text, to perform optical character recognition ("OCR"), to perform lexical analysis on the text, and/or to perform image recognition or similar. At step 435 the message's sender/recipient address may be mapped to alternatives, such as an address of <user1@example.com> mapping to <user1@2ndexample.com>. The alternative address(es) may be stored in the envelope, header, or body of an outer message which contains the (now inner) message. The alternatives may be obtained, for example, from the monitored user database 222. At step 437 the output of step 433 and/or 435 are acted on according to rules set up by the monitor customer, such as that lexical analysis at step 433 found the word "lawsuit" the output of which may cause the message to be flagged or to have the word included in message's index.

Figure 5:
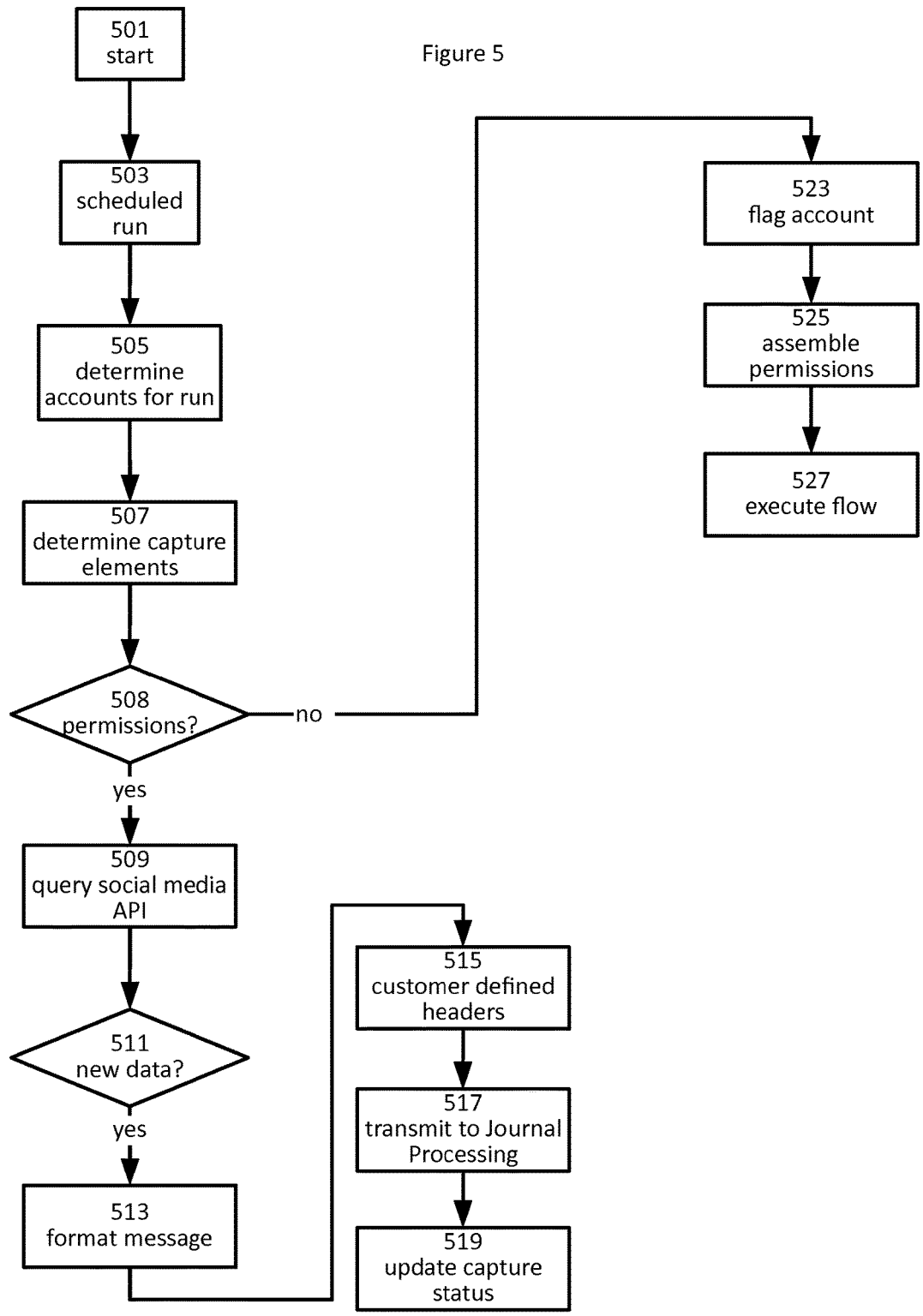
FIG. 5 is a flow chart of a process described in these papers.

FIG. 5 depicts a flow chart of steps in a process wherein content obtained from a social media network is journaled and archived. At step 501 the process starts and then proceeds, such as at step 503, by executing the process on a schedule, such as once per minute/hour/day/week/month or similar. At step 505, if not already performed, the social media network accounts associated with monitored users are identified, individual monitored users potentially being associated with more than one social media network account on one or more social media networks. At step 507 the capture elements are determined, such as whether a monitor customer wants to journal and archive all content, whether the monitor customer wants to exclude audio, video, or other non-static content, or similar.

At step 508 a determination may be made regarding whether the monitor 305 has sufficient permissions to proceed with accessing the social media network to obtain the monitored user's content. Not shown, this step may involve accessing a database for permissions associated with the account, determining if any permissions have been granted, if granted permissions have timed out (if this can be determined from, for example, an OAUTH credential or similar), if permission requirements at the social media network 107 have changed, or similar. This step may be combined with or be part of step 509 or may be seen in a result of step 509. As discussed above, permission to access content posted to the social media network 107 may have been memorialized through issuance of an OAUTH credential in a flow, by providing access credentials, or similar. If permissions are not sufficient, then the process may go to step 523 where the account is flagged, the permissions assembled in step 525, and the appropriate flow executed at step 527, during which the account holder will be requested to authorize the issuance of a new OAUTH credential or other permission token.

If permissions were sufficient at step 508, then at step 509 an API or similar for the social media network 107 may be used to query the social media network 107 or to otherwise obtain content posted to the social media network 107 by or in association with the account. If the social media network does not provide a way to obtain only new data compared to the last time that data was obtained, then at step 511 a determination may be made regarding whether the obtained content is new compared to the data which has previously been obtained. This determination may be performed by executing an MD5 message digest algorithm or similar hash function on the obtained data and comparing the obtained value to a value derived from previously obtained data. If new data is not found (not shown), then the process may proceed to step 519 (discussed below). If new data is found, then at step 513 one or more new messages, such as email messages, may be formatted to contain the new data. Email is a useful carrier for the new data because email is already used in message journaling and archival systems, the email bearing the content can be sent to a third-party message journaling and archival system, the MIME format is commonly used in both email and web-based content transmission and rendering systems, and the content can generally be formatted to be human-readable in an email.

At step 515 the message containing the data is customized per instructions set by the operator of the process and/or by monitor customers. In the context of email messages, examples of this include pre-/post-pending a string into the message subject line or body, including custom formatting in the message body to distinguish different instances of content posted to the social media network 107 in different parts and sub-parts of the message body, to call out the time/date (or a range of time/dates across which) the content was captured at step 509 and the time/date or range of times/dates across which the content was posted (if provided by the social media network 107), and mapping contact or identity information obtained from the social media network 107 to contact or identity information known to the operator of the process (obtained, for example, from the monitored user database 222), which mapped contact or identity information may be used in the addressing for the email message.

At step 517 the message may be transmitted to, for example, a journal processing server, such as 221, where the message may be processed, if it is an email message according to FIG. 4. Alternatively, the message may be transmitted to a journal, archive, or other repository as an XML, text, or Lotus Notes file or into a database through an SQL insert or similar. One message may be sent for each new content instance or for each time content (which may comprise more than one content instance) is obtained or a message may contain more than one content instance or content obtained across a range of times.

At step 519 the capture status for the account relative to the social media network 107 may be updated. The capture status may be recorded through use of a time-stamped identifier, through use of output of an MD5 or similar algorithm performed on content associated with the account profile, or similar.

Figure 6:
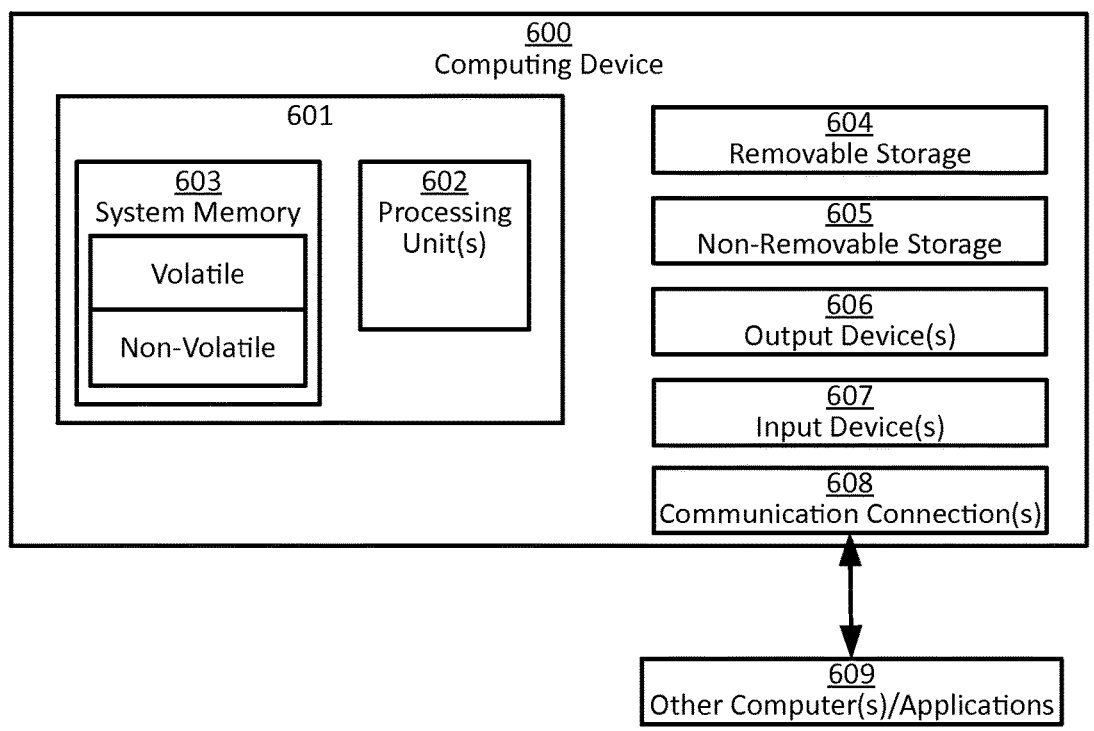
FIG. 6 is a functional block diagram of an exemplary computing device and some data structures and/or components thereof.

FIG. 6 is a functional block diagram of an exemplary computing device 600 that may be used to implement one or more computers described above. The computing device 600, in one basic configuration, comprises at least a processor 602 and memory 603. Depending on the exact configuration and type of computing device, memory 603 may be volatile (such as RAM), non-volatile (such as ROM, flash memory, etc.) or some combination of the two. Processing units and system memory may be combined, such as in a memory-resistor unit.

Computing device 600 includes one or more communication connections 608 that allow computing device 600 to communicate with one or more computers and/or applications 609. Device 600 may also have input device(s) 607 such as a keyboard, mouse, digitizer or other touch-input device, voice input device, etc. Output device(s) 606 such as a monitor, speakers, printer, PDA, mobile phone, and other types of digital display devices may also be included.

Additionally, device 600 may also have other features and functionality. For example, device 600 may also include additional storage (removable 604 and/or non-removable 605) including, but not limited to, solid-state media, magnetic or optical disks or tape. Computer storage media includes volatile and nonvolatile, removable and non-removable media implemented in any method or technology for storage of information such as computer readable instructions, data structures, program modules or other data. Memory 603, removable storage 604, non-removable storage 605, and smart cards 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 600. Any such computer storage media may be part of device 600.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

What is claimed is:

1. An apparatus for processing emails relating to a monitored user, the apparatus comprising a processor and instructions that, when executed by the processor, cause the apparatus to:
   receive an email message that contains an inner message which had been sent to or from a monitored user;
   determine a format of at least one of the email message or the inner message;
   identify addresses of at least one of senders or recipients in the email message;
   determine a monitor customer container count;
   if the monitor customer container count is greater than one, branch the email message and/or inner message for each monitor customer container count greater than one;
   perform a pre-scan of at least one of the email message or inner message, and analyze the pre-scan result to identify if the pre-scan result is associated with a journal destination;
   analyze at least one of message or inner message components;
   determine if analysis of message components is associated with the journal destination; and
   deliver at least one of the email message or inner message to at least one of a journal associated with the journal destination or an archive.

2. The apparatus of claim 1, wherein the instructions, when executed by the processor, further cause the apparatus to:
   query a social media provider for content associated with a first party;
   obtain from the social media provider content associated with the first party;
   select at least some of the content to journal and/or archive;
   format the email message to contain at least the selected content;
   map the content to the email message format;
   deliver the email message to at least one of the journal associated with the journal destination or the archive; and
   update a record associated with the first party to indicate that the content has been obtained.

3. A computing device for receiving email messages relating to a monitored user, the computing device, the computing device comprising a processor and instructions that, when executed by the processor, cause the computing device to execute a method, comprising:
   receiving an email message that contains an inner message which had been sent to or from a monitored user;
   determining a format of at least one of the email message or the inner message;
   identifying addresses of at least one of senders or recipients in the email message;
   determining a monitor customer container count;
   if the monitor customer container count is greater than one, branching the message and/or inner message for each monitor customer container count greater than one;
   performing a pre-scan of at least one of the email message or inner message, and analyzing the pre-scan result to identify if the pre-scan result is associated with a journal destination;
   analyzing message and/or inner message components;
   determining if analysis of message components is associated with the journal destination; and
   delivering the message and/or inner messages thereof to at least one of a journal associated with the journal destination or an archive.

4. The computer device of claim 3, the method further comprising:
   querying a social media provider for content associated with a first party;
   obtaining from the social media provider content associated with the first party;
   selecting at least some of the content to journal and/or archive;
   formatting the email message to contain at least the selected content;
   mapping the content to the email message format;
   delivering the email message to at least one of the journal associated with the journal destination or the archive; and
   updating a record associated with the first party to indicate that the content has been obtained.

5. The computer device of claim 3, wherein identifying addresses of at least one of senders or recipients in the received email message further comprises parsing inner email message headers to determine if the inner message was addressed to a sender and/or recipient not in an envelope of an outer journal message.

6. The computer device of claim 3, further comprising mapping sender and/or recipient addresses to alternatives.

7. The computer device of claim 6, further comprising including the alternatives in a message envelope of the outer journal message and/or the inner message.

8. The computer device of claim 3, the method further comprising delivering an outer journal message to more than one journal processor when a result of analysis of the set of components is associated with more than one journal processor.

9. The computer device of claim 3, wherein the monitor customer container count is determined by a domain name found in at least one of a message sender or a recipient address.

10. The computer device of claim 9, the method further comprising adding a recipient address associated with the domain name which caused the monitor customer container count to exceed one to a message envelope of the branch message and iterating.

11. The computer device of claim 10, wherein the added recipient address is pre-determined and indicates that the monitor customer container count for the branch message is one.

12. The computer device of claim 3, wherein the monitor customer container count is determined by comparing at least one of senders or recipients from the at least one of outer journal message or inner email message to records associated with monitor customers to determine one or more customer containers associated with at least one of senders or recipients associated with the monitor customers.

13. The computer device of claim 3, the method further comprising determining if the branch message is to be delivered to a remote destination, and, if so, determining a format for delivering the branch message and delivering the branch message to the remote destination in the determined format.

14. One or more non-transitory computer-readable storage media comprising a plurality of instructions that in response to being executed cause a computer to:
   determine a format of at least one of the email message or the inner message;
   identify addresses of at least one of senders or recipients in the email message;
   determine a monitor customer container count;
   if the monitor customer container count is greater than one, branch the email message and/or inner message for each monitor customer container count greater than one;
   perform a pre-scan of at least one of the email message or inner message, and analyze the pre-scan result to identify if the pre-scan result is associated with a journal destination;
   analyze at least one of the email message or inner message components;
   determine if analysis of message components is associated with the journal destination; and
   deliver at least one of the message or inner message to at least one of a journal associated with the journal destination or an archive.

15. The one or more non-transitory computer-readable storage media apparatus of claim 14, further containing instructions that, upon execution, cause the computer to:
   query a social media provider for content associated with a first party;
   obtain from the social media provider content associated with the first party;
   select at least some of the content to journal and/or archive;
   format the email message to contain at least the selected content;
   map the content to the email message format;
   deliver the email message to at least one of the journal associated with the journal destination or the archive; and
   update a record associated with the first party to indicate that the content has been obtained.

* * * * *